US010417581B2

(12) United States Patent
Agarwalla et al.

(10) Patent No.: US 10,417,581 B2
(45) Date of Patent: *Sep. 17, 2019

(54) QUESTION ANSWERING SYSTEM-BASED GENERATION OF DISTRACTORS USING MACHINE LEARNING

(71) Applicant: International Business Machines Corporation, Armonk, NY (US)

(72) Inventors: Lalit Agarwalla, Bangalore (IN); Ashish Mungi, Bangalore (IN); Joy Mustafi, Kolkata (IN); Ankur Parikh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 595 days.

This patent is subject to a terminal disclaimer.

(21) Appl. No.: 15/160,243

(22) Filed: May 20, 2016

(65) Prior Publication Data
US 2016/0292593 A1    Oct. 6, 2016

Related U.S. Application Data

(63) Continuation of application No. 14/672,286, filed on Mar. 30, 2015, now Pat. No. 9,684,876.

(51) Int. Cl.
*G06N 20/00* (2019.01)
*G09B 7/06* (2006.01)
(Continued)

(52) U.S. Cl.
CPC ....... *G06N 20/00* (2019.01); *G06F 16/90332* (2019.01); *G06F 17/2785* (2013.01); *G09B 7/06* (2013.01)

(58) Field of Classification Search
CPC ... G09B 3/00; G09B 5/00; G09B 7/00; G09B 17/00; G09B 17/003; G09B 7/06; G06F 17/27; G06F 17/2795; G06F 17/30011; G06F 17/30265; G06F 17/3028; G06F 17/30705; G06F 17/30707; G06F 16/90332; G06F 17/2785; G09N 20/00
(Continued)

(56) References Cited

U.S. PATENT DOCUMENTS 5,519,608 A      5/1996  Kupiec
6,144,838 A  *  11/2000  Sheehan ................. G09B 7/02
                                              434/118
(Continued)

OTHER PUBLICATIONS

Ravichandran et al., "Learning Surface Text Patterns for a Question Answering System" 2002, In Proceedings of be ACL Conference 7 pages.
(Continued)

*Primary Examiner* — Jack Yip
(74) *Attorney, Agent, or Firm* — Dmitry Paskalov

(57) ABSTRACT

Generating distractors for text-based MCT items. An MCT item stem is received. The stem is transmitted to a QA system and a plurality of candidate answers related to the stem is received from the QA system. Incorrect answers in the plurality of candidate answers are identified. Textual features are extracted from the stem. A set of semantic criteria associated with the extracted textual features is generated. Based on the generated semantic criteria, a subset of the incorrect candidate answers is selected.

7 Claims, 6 Drawing Sheets

(51) Int. Cl.
  *G06F 16/9032* (2019.01)
  *G06F 17/27* (2006.01)
(58) Field of Classification Search
  USPC .................................................. 434/362, 322
  See application file for complete search history.

(56) References Cited

U.S. PATENT DOCUMENTS

| | | | | |
|---|---|---|---|---|
| 6,484,010 | B1* | 11/2002 | Sheehan | G09B 7/02 434/118 |
| 7,136,877 | B2* | 11/2006 | Volcani | G06F 17/2795 704/10 |
| 7,603,330 | B2 | 10/2009 | Gupta et al. | |
| 7,791,466 | B2* | 9/2010 | Agarwalla | G08B 13/19615 340/286.14 |
| 7,912,722 | B2 | 3/2011 | Higgins | |
| 8,109,765 | B2* | 2/2012 | Beattie | G10L 15/22 434/156 |
| 8,126,825 | B2* | 2/2012 | Guyon | G06F 19/24 706/12 |
| 8,202,097 | B1 | 6/2012 | Brittingham et al. | |
| 8,275,803 | B2 | 9/2012 | Brown et al. | |
| 8,517,738 | B2* | 8/2013 | Sheehan | G09B 17/003 434/156 |
| 8,568,144 | B2* | 10/2013 | Morrison | G09B 17/003 434/167 |
| 8,849,790 | B2* | 9/2014 | Bellare | G06F 17/3028 706/45 |
| 8,888,493 | B2* | 11/2014 | Sheehan | G09B 17/003 434/169 |
| 8,954,357 | B2* | 2/2015 | Faddoul | G06N 99/005 706/12 |
| 8,996,350 | B1* | 3/2015 | Dub | G06F 17/30011 704/1 |
| 9,240,128 | B2 | 1/2016 | Bagchi et al. | |
| 9,262,935 | B2 | 2/2016 | Nielson et al. | |
| 9,317,586 | B2 | 4/2016 | Chu-Carroll et al. | |
| 9,330,084 | B1 | 5/2016 | Kadambi et al. | |
| 9,384,678 | B2* | 7/2016 | Tinkler | G09B 19/04 |
| 9,536,439 | B1* | 1/2017 | Goldstein | G09B 7/00 |
| 9,620,117 | B1* | 4/2017 | Gilbert | G10L 15/26 |
| 2003/0203342 | A1* | 10/2003 | Bowers | G06F 11/3684 434/118 |
| 2004/0076941 | A1* | 4/2004 | Cunningham | G09B 7/02 434/350 |
| 2005/0026131 | A1* | 2/2005 | Elzinga | G09B 5/00 434/365 |
| 2006/0078864 | A1 | 4/2006 | Jorgensen et al. | |
| 2007/0134631 | A1* | 6/2007 | Hardy | G09B 7/02 434/236 |
| 2007/0141541 | A1* | 6/2007 | Chan | G09B 5/06 434/236 |
| 2009/0287678 | A1 | 11/2009 | Brown et al. | |
| 2010/0081120 | A1 | 4/2010 | Nanjiani et al. | |
| 2010/0273138 | A1 | 10/2010 | Edmonds et al. | |
| 2011/0125734 | A1 | 5/2011 | Duboue et al. | |
| 2011/0236873 | A1* | 9/2011 | Bowers | G06F 11/3684 434/362 |
| 2011/0257961 | A1 | 10/2011 | Tinkler et al. | |
| 2012/0251984 | A1* | 10/2012 | Tinkler | G09B 19/08 434/156 |
| 2013/0007033 | A1 | 1/2013 | Brown et al. | |
| 2013/0149681 | A1* | 6/2013 | Tinkler | G09B 7/04 434/167 |
| 2013/0304730 | A1 | 11/2013 | Zhou | |
| 2014/0250032 | A1 | 9/2014 | Huang et al. | |
| 2014/0255896 | A1* | 9/2014 | Saha | G09B 7/00 434/350 |
| 2014/0342323 | A1 | 11/2014 | Nielson et al. | |
| 2015/0178623 | A1 | 6/2015 | Balani et al. | |
| 2015/0179082 | A1 | 6/2015 | Byron et al. | |
| 2015/0293917 | A1 | 10/2015 | Bufe, III et al. | |

OTHER PUBLICATIONS

Mendes et al., "Bootstrapping Multi-Choice Tests with The-Mentor" Computational Linguistics and Intelligent Text Processing 2011, Springer-Verlag Berlin Heidelberg, Part 1, pp. 451-462.

Chen et al., "FAST—An Automatic Generation System for Grammer Tests", Proceedings of the COLING/ACL 2006 Interactive Presentation Sessions, Jul. 2006, pp. 1-4.

Sumita et al., "Measuring Non-native Speakers' Proficiency of English by Using a Test with Automatically-Generated Fill-in-the-Blank Questions", Proceedings of the 2nd Workshop on Building Educational Applications Using NLP Jun. 2005, pp. 61-68.

Zesch et al., "Automatic Generation of Challenging Distractors Using Context-Sensitive Inference Rules", Proceedings of the Ninth Workshop on Innovative Use of NLP for Building Educational Applications, Jun. 26, 2014, pp. 143-148.

Li et al., "Learning Question Classifers", Proceedings of the 19th International Conference on Computational Linguistics 2002, pp. 1-7.

Curto et al., "Exploring linguistically-rich patterns for question generation", Proceedings of the UCNLG+Eval: Language Generation and Evaluation Workshop Jul. 31, 2011, pp. 33-38.

Agarwal et al., "Automatic Gap-fill Question Generation from Text Books," Proceedings of the Sixth Workshop on Innovative Use of NPL for Building Educational Applications, Portland, Oregon, Jun. 24, 2011, pp. 56-64.

Aldabe et al., "ArikIturri: An Automatic Question Generator Based on Corpora and NLP Techniques," ITS 2006, LNCS 4053, pp. 584-594.

Aldabe et al., "Automatic Distractor Generation for Domain Specific Texts," IceTAL 2010, LNAI 6233, pp. 27-38.

Wikipedia, The Free Encyclopedia, "Commonsense reasoning," http://en.wikipedia.org/wiki/Commonsense_reasoning, Accessed on Jan. 6, 2015, pp. 1-3.

dictionary.com, "distractor", http://dictionary.reference.com/browse/distractor, Accessed on Mar. 10, 2015, 3 pages.

Wikipedia, The Free Encyclopedia, "Feature extraction," http://en.wikipedia.org/wiki/Feature_extraction, Accessed on Jan. 6, 2015, pp. 1-3.

Goto et al., "Automatic Generation System of Multiple-Choice Cloze Questions and its Evaluation," Knowledge Management & E-Learning: An International Journal, vol. 2, No. 3, 2010, pp. 210-224.

Hall et al., "Practical Feature Subset Selection for Machine Learning," Computer Science '98 Proceedings of the 21st Australasian Computer Science Conference ASCS '98, Perth, Feb. 4-6, 1998, Publisher: Springer.

Wikipedia, The Free Encyclopedia, "Latent semantic analysis," http://en.wikipedia.org/wiki/Latent_semantic_analysis, Accessed on Jan. 6, 2015, pp. 1-7.

Linnebank et al., "Question generation and answering," DynaLearn, University of Amersterdam (UVA), Version 05 (final), Submission date: Aug. 8, 2010, Project No. 231526, pp. 1-40.

Wikipedia, The Free Encyclopedia, "Machine learning," http://en.wikipedia.org/wiki/Machine_learning, Accessed on Jan. 6, 2015, pp. 1-12.

Educational Natural Language Processing Tutorial Notes, References, Generation of Exercises, Coling 2008: Manchester, Aug. 2008, http://www.aclweb.org/anthology-new/C/C08/C08-4002.pdf, pp. 53-59.

Mitkov et al., "A computer-aided environment for generating multiple-choice test items," Natural Language Engineering, vol. 12, Issue 2, 2006, pp. 177-194, 2006, Cambridge University Press.

Mitkov et al., "Semantic similarity of distractors in multiple-choice tests: extrinsic evalutation," University of Wolverhampton, Workshop on Geometrical Models of Natural Language Semantics, Conference of the European Chapter of the Association for Computational Linguistics 2009 (EACL-09), http://ants.iis.sinica.edu.tw/3bkmj9ltewxtsrrvnoknfdxrm3zfwrr/26/semantic%20similarity%20of%20distractors%20in%20multiplechoice%20tests.ppt., pp. 1-49.

(56) References Cited

OTHER PUBLICATIONS

Moser et al., "Refined Distractor Generation with LSA and Stylometry for Automated Multiple Choice Question Generation," AI 2012, LNCS 7691, pp. 95-106, Springer-Verlag Berlin Heidelberg 2012, 12 pages.

Wikipedia, The Free Encyclopedia, "Multi-label classification," http://en.wikipedia.org/wiki/Multi-label_classification, Accessed on Jan. 6, 2015, pp. 1-4.

Nikolova, "New Issues and Solutions in Computer-aided Design of MCTI and Distractors Selection for Bulgarian," Multilingual Resources, Technologies and Evaluation for Central and Eastern European Languages 2009, Bulgaria, pp. 40-46.

University of Pennsylvania, "The Penn Treebank Project," http://www.cis.upenn.edu/~treebank/, Accessed on Jan. 6, 2015, pp. 1-2.

Pho et al., "Multiple Choice Question Corpus Analysis for Distractor Characterization," Proceedings of the Ninth International Conference on Language Resources and Evaluation (LREC-2014), 8 pages.

Pino et al., "Semi-Automatic Generation of Cloze Question Distractors Effect of Students' L1," Proceedings of the SLaTE Workshop on Speech and Language Technology in Education, 2009, http://www.cs.cmu.edu/~max/mainpage_files/Pino-Eskenazi-SLaTE09.pdf, 4 pages.

Wikipedia, The Free Encyclopedia, "Semantic analysis (linguistics)," http://en.wikipedia.org/wiki/Semantic_analysis_%28linguistics%29, Accessed on Jan. 6, 2015, 1 page.

Shah, "Automatic Question Generation using Discourse Cues and Distractor Selection for Cloze Questions," A Thesis, Language Technology and Research Center (LTRC), International Institute of Information Technology, Hyderbad—500032, India, Jul. 2012, pp. 1-40.

The Stanford NLP (Natural Language Processing) Group, "Stanford Dependencies," http://nlp.stanford.edu/software/stanforddependencies.shtml, Accessed on Jan. 6, 2015, pp. 1-3.

Stanford Parser, "Parse," http://nlp.stanford.edu:8080/parser/, Accessed on Jan. 6, 2015, pp. 1-2.

Linguistics Online, "Syntactic ambiguity," http://languagelink.let.uu.nl/~lion/?s=Grammar_exercises/grammar_4, Accessed on Jan. 6, 2015, 1 page.

Cornell University, "What is Anaphora Resolution?", http://www.cs.cornell.edu/boom/2000sp/2000%20projects/anaphora/definition.html, Accessed on Jan. 6, 2014, 1 page.

Zhang et al., "A Review on Multi-Label Learning Algorithms," IEEE Transcations on Knowledge & Data Engineering, vol. 26, No. 8, Aug. 2014, pp. 1-42.

Carnegie Mellon School of Computer Science, "Parse a sentence," http://www.link.cs.cmu.edu/link/submit-sentence-4.html, Accessed on Mar. 13, 2015, 1 page.

Mell et al., "The NIST Definition of Cloud Computing," National Institute of Standards and Technology, Information Technology Laboratory, Version 15, Oct. 7, 2009, 2 pages.

Pending U.S. Appl. No. 14/672,286, filed Mar. 30, 2015, entitled; "Question Answering System-Based Generation of Distractors Using Machine Learning", pp. 1-40.

IBM, List of IBM Patents or Patent Applications Treated as Related, Appendix P, dated May 23, 2016, 2 pages.

Pending U.S. Appl. No. 15/160,243, filed May 20, 2016 entitled: "Question Answering System-Based Generation of Distractors Using Machine Learning", pp. 1-40.

* cited by examiner

QUESTION ANSWERING SYSTEM-BASED GENERATION OF DISTRACTORS USING MACHINE LEARNING

BACKGROUND

The present invention relates generally to the field of computerized test item generation, and more particularly to automatically generating distractors for text-based multiple-choice test items.

A multiple-choice test is a form of assessment in which respondents are asked to select the best possible answer or answers out of the choices from a list. Among the possible choices are, typically, the correct answer and a number of incorrect answers, called distractors.

Question Answering (QA) is a computer science discipline within the fields of information retrieval and natural language processing which is concerned with building systems that automatically answer questions posed in a natural language. In response to a question, or query, a typical QA system may return a list of answers, ranked by degree of confidence in the correctness of each answer.

SUMMARY

Embodiments of the present invention disclose a method, computer program product, and system for generating distractors for text-based multiple choice test (MCT) items. An MCT item stem is received. The stem is transmitted to a question answering (QA) system and a plurality of candidate answers related to the stem is received from the QA system. Incorrect answers in the plurality of candidate answers are identified. Textual features are extracted from the stem. A set of semantic criteria associated with the extracted textual features is generated. Based on the semantic criteria, a subset of the incorrect candidate answers is selected.

DETAILED DESCRIPTION

Figure 1:
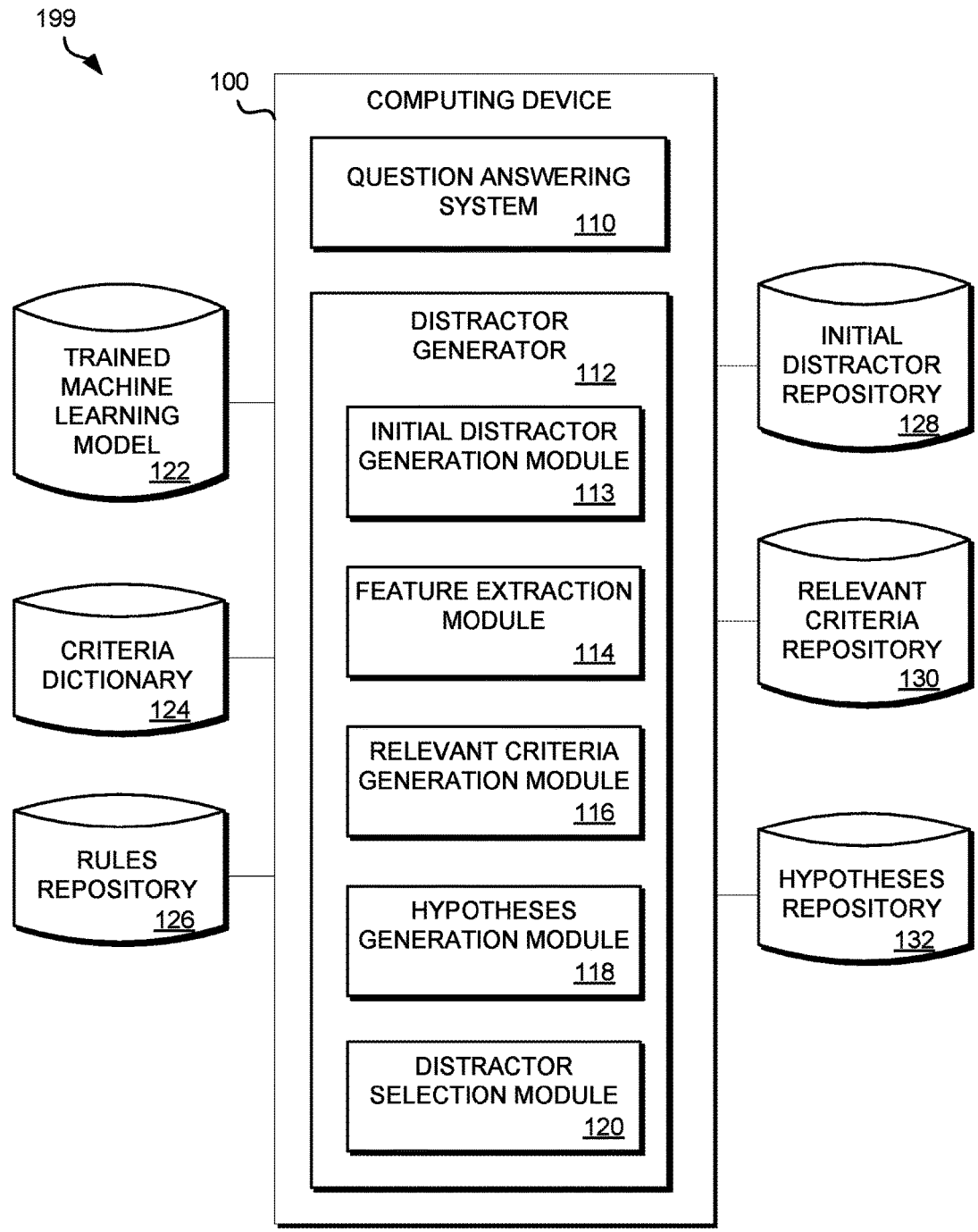
FIG. 1 is a functional block diagram of a distractor generation environment, in accordance with an embodiment of the present invention.

Embodiments of the present invention are directed to methods for automatically generating, by a computer, distractors for text-based multiple-choice test items.

A multiple-choice test (MCT) item consists of a stem and a set of alternatives. The stem is the beginning part of the item that presents the item as a problem to be solved, a question to be answered, or an incomplete statement to be completed. A stem may also include other relevant information. The alternatives are the possible answers that the respondent can choose from, with the correct answer called the key and the incorrect answers called distractors. For example, an MCT item may consist of a stem "What is the capital of India?", and alternatives "New Delhi", "Shimla", "Kolkata", and "Mumbai". In this instance, the key is "New Delhi", while "Shimla", "Kolkata", and "Mumbai" are distractors.

Efficient distractors are viable alternatives for an MCT item which, despite being incorrect, are nonetheless plausible. For example, for the stem just mentioned, "What is the capital of India?", the distractors "Shimla", "Kolkata", and "Mumbai" are populous cities in India, which are capitals of a state.

Machine learning is a subfield of computer science and statistics that explores the construction and study of algorithms that can learn from data. Such algorithms operate by building a model based on inputs and using the model to make predictions or decisions, rather than following only explicitly programmed instructions. Classification is a machine learning task in which inputs are assigned to, or labeled as belonging to, two or more classes. Applications of classification include spam filtering and optical character recognition.

In supervised machine learning, a classification function may be inferred, or trained, from a set of labeled training data. The training data consists of training examples, typically pairs of input objects and desired output objects, for example class labels. During training, the parameters of the model are adjusted, usually iteratively, so that inputs are assigned to one or more of the classes to some degree of accuracy, based on a predefined metric. The inferred classification function can then be used to categorize new examples. One example of a machine learning classification technique is multi-label classification (MLC), in which multiple class labels, or categories, are assigned simultaneously to a single instance of an object. In multi-label text classification, for instance, a document or text passage is associated with a set of keywords or topics.

Feature extraction is often applied before MLC, in order to reduce and refine the set of relevant labels. In machine learning, feature extraction starts from an initial set of data, for example a text document, and builds derived values, or features, intended to be informative, non-redundant, and which facilitate subsequent learning and generalization steps. The extracted features are expected to contain the relevant information from the input data, so that a desired task may be performed by using the reduced representation rather than the complete initial data.

Textual features extracted from a text document, or a string such as an MCT item stem, may include nouns and adjectives present in the text and may exclude common words such as "the, is, that, a, on", etc. In general, features extracted from a text document may include terms in the document and concepts semantically related to terms in the document. Common methods of textual feature extraction include Principal Component Analysis and Latent Semantic Analysis.

In machine learning, a hypothesis is a statement relating descriptive attributes of a concept to values those attributes may assume in instances of the concept. A simple example is an attribute-value pair, such as "attribute A has value V". Hypothesis evaluation is the testing of a hypothesis against the set of categorized training instances in the machine learning model. By answering the question, "What patterns match the data?", machine learning algorithms may automate the generation and evaluation of hypotheses.

FIG. 1 is a functional block diagram of a distractor generation environment 199, in accordance with an embodiment of the current invention. Distractor generation environment 199 includes computing device 100, which further includes QA system 110 and distractor generator (DG) 112. Distractor generation environment 199 includes a variety of data repositories, for example, trained machine learning model 122, criteria dictionary 124, rules repository 126, initial distractor repository 128, relevant criteria repository 130, and hypotheses repository 132. Trained learning model 122, criteria dictionary 124, and the repositories 126, 128, 130, and 132, 124 may reside, for example, on computer readable storage media 308 (FIG. 3), or on cloud computing node storage system 34 (FIG. 4).

Distractor generation environment 199 illustrates one example of the basic functional blocks of a distractor generation environment. Other models for a distractor generation environment may be available, which describe a distractor generation environment in greater or lesser granularity and with different functional boundaries between functional blocks.

QA system 110 may be any of a variety of proprietary, open source, or Web-based QA systems, for example ASK.COM or the START (SynTactic Analysis using Reversible Transformations) natural language QA system.

DG 112 may include initial distractor generation module 113, feature extraction module 114, relevant criteria generation module 116, hypotheses generation module 118, and distractor selection module 120.

In an exemplary embodiment of the invention, initial distractor generation module 113 may query QA system 110, using as input an MCT item stem. QA system 110 may return a list of possible, or candidate, answers, ranked according to a confidence score, a numerical value which represents a degree of confidence in the correctness of each candidate answer. Initial distractor generation module 113 may select a number of the highest ranked candidate answers. The number of candidate answers selected may be, for example, at least the number of alternatives required for an MCT item, and at most a predefined maximum number. Initial distractor generation module 113 may identify and delete correct answers, if present, from the list of candidate answers to produce an initial set of candidate distractors. For example, initial distractor generation module 113 may determine the degree to which a candidate answer matches the key using a string similarity measure. DG 112 may store the selected candidate distractors in initial distractor repository 128. Table 1 illustrates a possible set of candidate answers to the query "What is the capital of India" from an exemplary QA system.

TABLE 1

| CANDIDATE ANSWER | COMMENTS |
| --- | --- |
| 1 New Delhi | Correct answer |
| 2 Patna | Capital of Maurya Empire of ancient India |
| 3 Kolkata | Capital of British India until 1911 |
| 4 Shimla | Summer capital of India during British times |
| 5 Hastinapur | Capital of ancient Indian kingdoms |
| 6 NCR | National Capital Region |
| 7 Mumbai | Commercial capital of India |
| 8 Delhi | State in India containing New Delhi |
| 9 Gurgaon | City within National Capital Region |

After removing the correct answer, New Delhi, the list of candidate distractors may comprise candidate answers 2-9 in Table 1.

In an exemplary embodiment of the invention, feature extraction module 114 may identify keywords or topics associated with the stem. For example, feature extraction module 114 may analyze the grammatical structure of the stem to identify words and phrases which are the subject or object of a verb. This analysis may include tagging the words of the stem with parts of speech, such as nouns, verbs, adjectives, adverbs, pronouns, conjunctions, prepositions, interjections, and articles. This tagging may be accomplished, for example, using a natural language parsing program such as the Stanford Parser, version 3.5.1, available from The Stanford Natural Language Processing Group at Stanford University, or other proprietary and/or open source natural language parsers. The identified words and phrases may be analyzed to identify additional, semantically related keywords and topics in a lexical database such as WordNet, which may identify synonyms, or a commonsense knowledge base such as ConceptNet, which may identify terms related by meaning. For example, for the stem "What is the capital of India?", natural language parsing may generate the list of words, What, is, the, capital, of, India. Semantic analysis may then generate, as extracted features, the words, what, is, capital, India, country, location, city.

In an exemplary embodiment of the invention, relevant criteria generation module 116 operates generally to use the features extracted by feature extraction module 114, along with a trained machine learning model 122, applied to a set of criteria defined in criteria dictionary 124, to select a set of criteria relevant to the extracted features, and store the relevant criteria in relevant criteria repository 130, as described in more detail below.

In an embodiment of the invention, criteria dictionary 124 may contain a set of defined criteria. A criterion may be an attribute, category, or fact about an entity or event. Criteria may be domain-specific, for example in the medical domain, or domain independent, i.e., generic. Criteria may also be question independent or question dependent. For example, a criterion may be 'Is Country' (question independent) or 'Is Inside % Object %' (question dependent), where % Object % is a placeholder, or variable, that stands for the main object of the question, which may be determined, for example, through natural language processing (NLP) techniques such as syntactic or semantic parsing. A criterion may have a list of synonyms. For example, the criterion 'Is Inside % Object %' may have synonyms such as 'Is Part of % Object %' or 'Is Within % Object %'. Notation such as % Object % may be used to differentiate a question-dependent criterion, where the value of % Object % is derived, for example, from NLP analysis data, from a question-independent criterion such as Object, without the % . . . % variable markers. If a criterion contains a variable such as % Object %, the variable may be resolved to a definite value, based, for example, on typed dependencies or other NLP analysis techniques, before the criterion is evaluated or applied. Criteria dictionary 124 may be generic/domain independent, or domain specific. Criteria dictionary 124 may contain all independent criteria, or may contain only question-dependent criteria, or a combination of independent and question-dependent criteria. In various embodiments, criteria dictionary 124 may be defined and implemented, for example, via a text list, key-value pairs, XML, or a table in a data repository, etc.

Table 2 shows a criteria dictionary 124, in an exemplary embodiment of the invention:

TABLE 2

| QUESTION-INDEPENDENT CRITERIA | QUESTION-DEPENDENT CRITERIA |
| --- | --- |
| Is Country | Is Inside %Object% |
| Is City | Is Part of %Object% |
| Is Capital | Is Within %Object% |
| Is Current Capital | |
| Is Electronic Device | |
| Is Cricket Playing Country | |
| Is Politician | |
| Is Scientist | |
| Is Researcher | |

In an embodiment of the invention, trained machine learning model 122 may apply MLC to the features extracted by feature extraction module 114, using the criteria contained in criteria dictionary 124 as labels, to select as relevant criteria, for example, those criteria chosen as labels for the extracted features, and may store the subset of relevant criteria in relevant criteria repository 130. For example, the output of trained machine learning model 122, applied to the extracted features what, is, capital, India, country, location, city, using the exemplary criteria dictionary shown above, may be the relevant criteria Is City, Is Current Capital, Is Inside % Object %.

In an exemplary embodiment of the invention, trained machine learning model 122 may be trained to apply MLC, for example, using supervised learning with manually labeled data, comprising questions such as "Who is the president of the U.S.?", paired with criteria such as "Is current president", "Is politician", or "Citizen of % Object %".

In an embodiment of the invention, relevant criteria generation module 116 may further apply a set of rules, which may reside in rules repository 126, to the relevant criteria stored in relevant criteria repository 130, in order to refine the relevant criteria. For example, a rule may be "use only question-independent criteria". In this case, for the relevant criteria shown above, the refined set of relevant criteria may be Is City, Is Current Capital. In certain embodiments, rules may be static, or predefined. In other embodiments, rules may be dynamically generated, for example, based on specific MCT items or the domain of the MCT.

In an embodiment of the invention, hypothesis generation module 118 may combine the refined relevant criteria generated by relevant criteria generation module 116 with the candidate distractors generated by initial distractor generation module 113 and stored in initial candidate distractor repository 128 to generate hypotheses concerning the initial candidate distractors. For example, for the candidate distractors of Table 1, a generated set of hypotheses may be Patna is city
Patna is current capital
Kolkata is city
Kolkata is current capital
Shimla is city
Shimla is current capital
Hastinapur is city
Hastinapur is current capital
NCR is city
NCR is current capital
Mumbai is city
Mumbai is current capital
Delhi is city
Delhi is current capital
Gurgaon is city
Gurgaon is current capital The term evidence-based refers to a concept or strategy that is derived from or informed by objective evidence, for example data, academic research, or scientific findings. In evidence-based scoring, a hypothesis is evaluated by first collecting evidence supporting or refuting the hypothesis, and then assigning to the hypothesis a confidence score, or numerical value representing the degree to which the evidence justifies or refutes the hypothesis.

In an embodiment of the invention, distractor selection module 120 may evaluate each of the hypotheses generated by hypotheses generation module 118 to select a set of efficient distractors. For example, distractor selection module 120 may employ evidence-based scoring to select the efficient distractors. Distractor selection module 120 may collect evidence in the form of text passages retrieved from a knowledge base such as Wikidata in response to the hypothesis, entered as a query. In computing a confidence score, distractor selection module 120 may consider the degree of match between the retrieved passages' predicate-argument structure and the hypothesis, passage source reliability, geospatial location, temporal relationships, taxonomic classification, lexical and semantic relations the hypothesis is known to participate in, its popularity or obscurity, its aliases, and so on. For example, distractor selection module 120, employing evidence-based scoring, might evaluate the generated hypotheses to either True or False and assign an evidence score as follows Patna is city (True, evidence score 0.75)
Patna is current capital (True, evidence score 0.85)
Kolkata is city (True, evidence score 0.8)
Kolkata is current capital (True, evidence score 0.9)
Shimla is city (True, evidence score 0.8)
Shimla is current capital (True, evidence score 0.85)
Hastinapur is city (True, evidence score 0.7)
Hastinapur is current capital (False, evidence score 0.35)
NCR is city (False, evidence score 0.2)
NCR is current capital (False, evidence score 0.4)
Mumbai is city (True, evidence score 0.9)
Mumbai is current capital (True, evidence score 0.9)
Delhi is city (False, evidence score 0.45)
Delhi is current capital (True, evidence score 0.9)
Gurgaon is city (True, evidence score 0.85)
Gurgaon is current capital (False, evidence score 0.4)

Based on this exemplary output, distractor selection module 120 may select the candidate distractors for which the generated hypotheses were evaluated as True as efficient distractors: Patna, Kolkota, Shimla, Mumbai.

Distractor selection module 120 may further reduce the set of efficient distractors to a predefined number. For example, if for an MCT item only three distractors are desired, distractor selection module 120 may select the three efficient distractors with the highest average evidence-based score. In the foregoing example, these may be Kolkota, Shimla, Mumbai.

Figure 2:
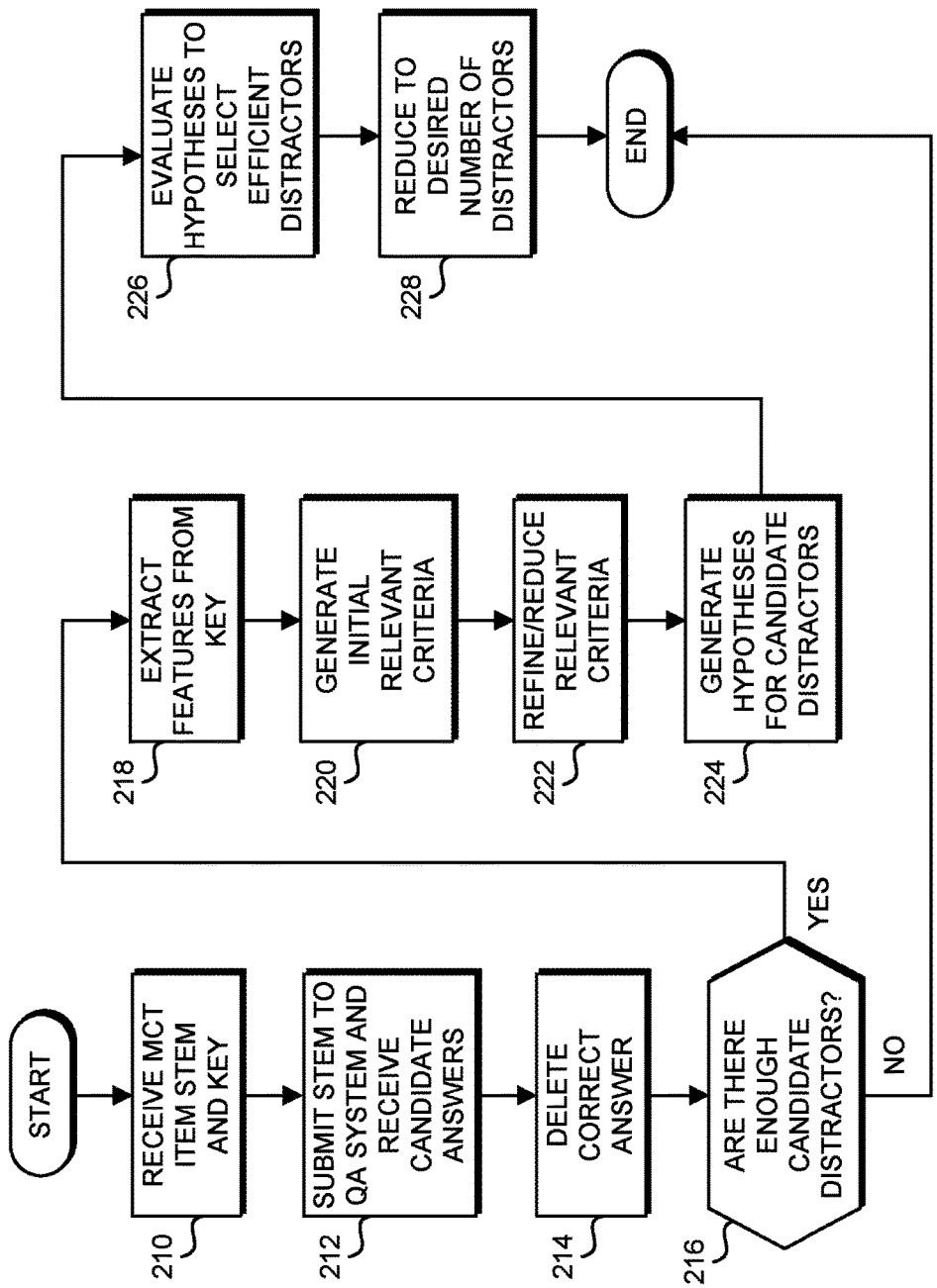
FIG. 2 is a flowchart depicting operational steps of a distractor generator, in accordance with an embodiment of the present invention.

FIG. 2 is a flowchart depicting various steps used in a DG 112 (FIG. 1), in accordance with an exemplary embodiment of the invention. DG 112 (FIG. 1) may receive an MCT item stem, along with its key (step 210). Initial distractor generation module 113 (FIG. 1) may submit the stem to QA system 110 (FIG. 1) as a query and receive from QA system 110 (FIG. 1) a list of candidate answers to the query (step 212). Initial distractor generation module 113 (FIG. 1) may identify any correct answers, if present, by comparison with the key, and remove them from the list of candidate answers (step 214). The remaining candidate answers may constitute an initial set of candidate distractors. Initial distractor generation module 113 (FIG. 1) determines if there are enough candidate distractors, based on a predetermined threshold (decision step 216). If there are not enough candidate distractors (decision step 216, "NO" branch), processing ends. If there are enough candidate distractors (decision step 216, "YES" branch), processing continues. Feature extraction module 114 (FIG. 1) may analyze the stem to extract a set of features (step 218). Relevant criteria generation module 116 (FIG. 1) may apply trained machine learning model 122 (FIG. 1) using, for example, MLC with the extracted features and criteria dictionary 124 (FIG. 1) as inputs, to generate an initial set of relevant criteria (step 220). Relevant criteria generation module 116 (FIG. 1) may refine the relevant criteria using a predefined set of rules (step 222). Hypotheses generation module 118 (FIG. 1) may apply the refined set of relevant criteria to the initial set of candidate distractors to generate hypotheses for each candidate distractor (step 224). Distractor selection module 120 (FIG. 1) may evaluate the hypotheses to select a set of efficient distractors (step 226), which may be reduced to a predetermined number of distractors (step 228).

Figure 3:
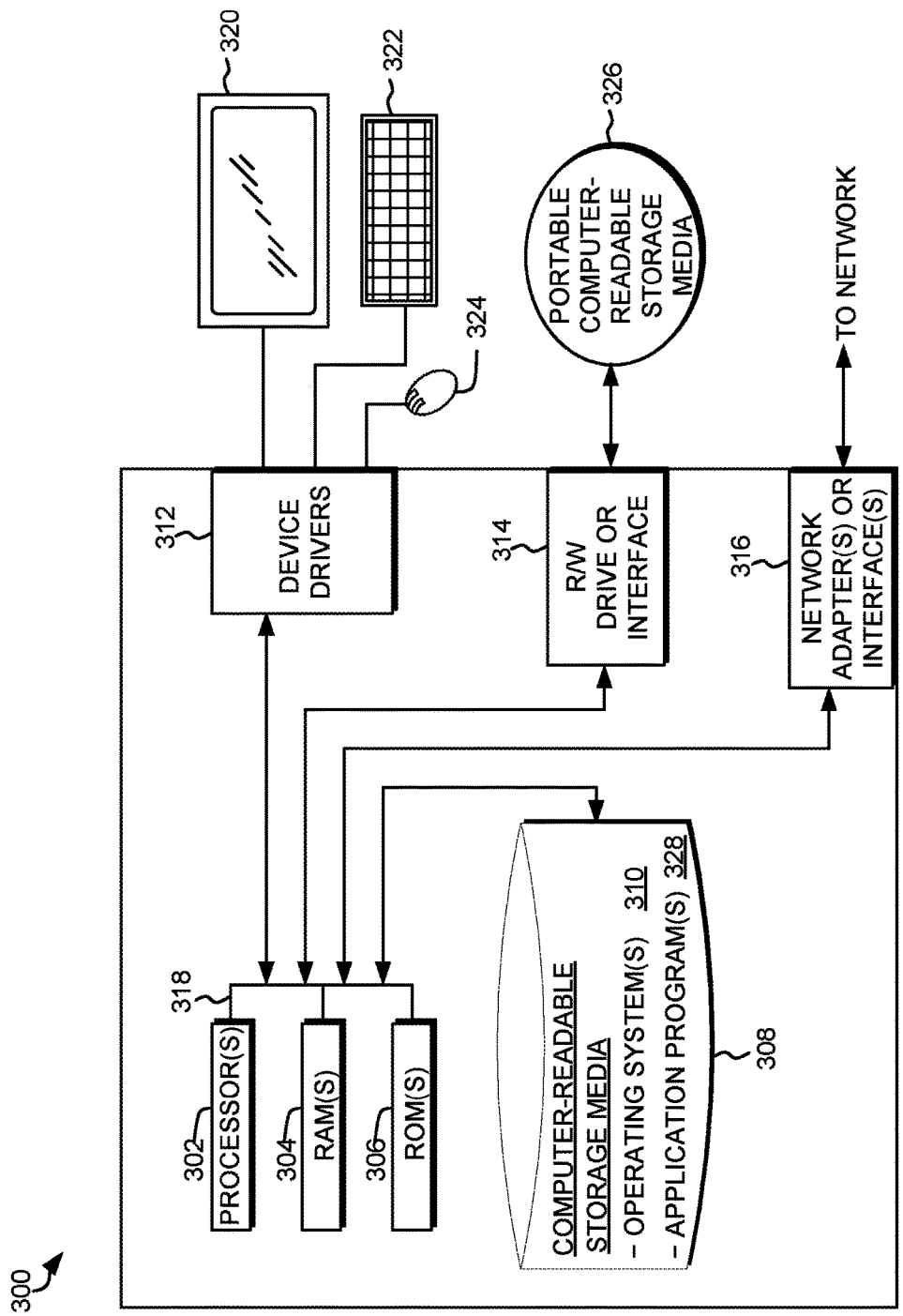
FIG. 3 is a functional block diagram illustrating a data processing environment, in accordance with an embodiment of the present invention.
Figure 4:
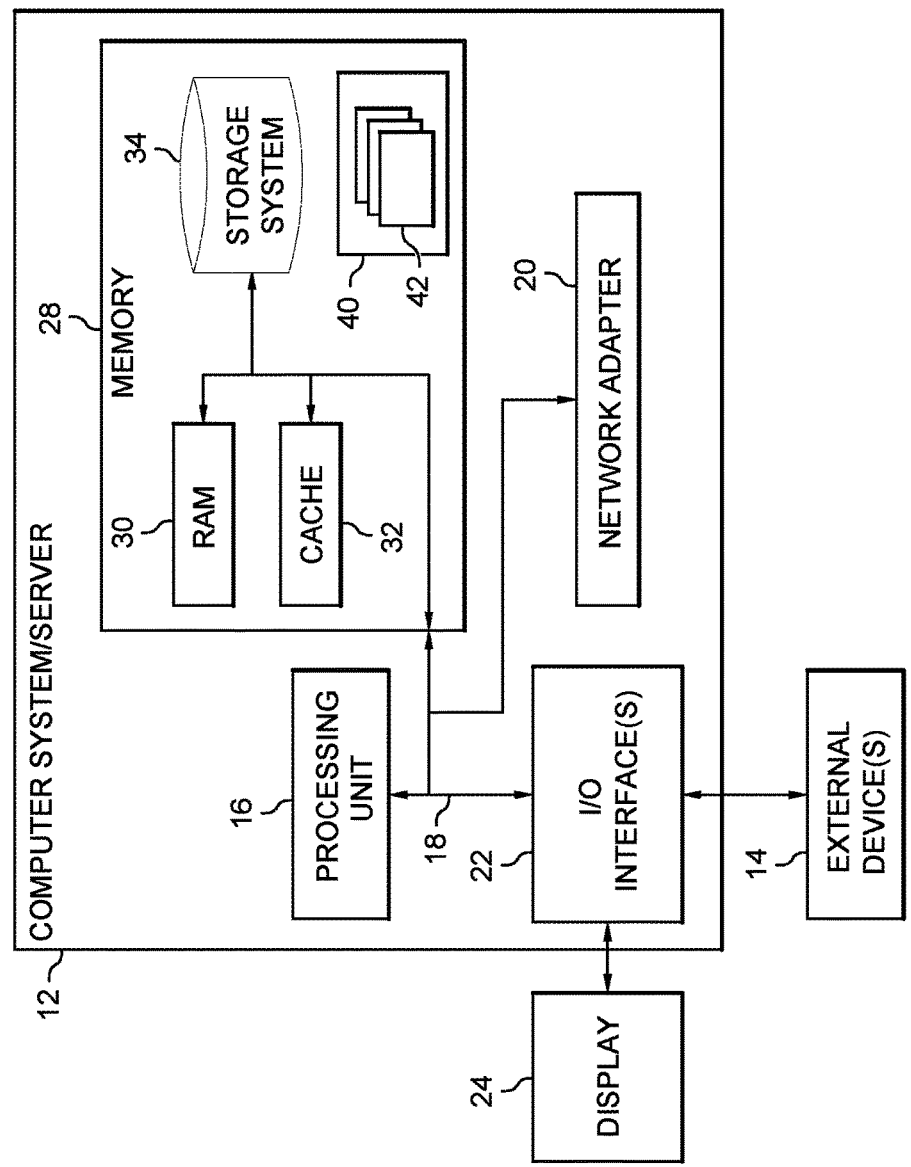
FIG. 4 depicts a cloud computing node according to an embodiment of the present invention.

FIG. 3 depicts a block diagram 300 of components of a computing device 100 (FIG. 1), in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device 100 may include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 may be implemented with any architecture designed for passing data and/or control information between processors (such as microprocessors, communications and network processors, etc.), system memory, peripheral devices, and any other hardware components within a system.

One or more operating systems 310, and one or more application programs 328, for example, DG 112 and/or QA system 110 (FIG. 1), are stored on one or more of the computer readable storage media 308 for execution by one or more of the processors 302 via one or more of the respective RAMs 304 (which typically include cache memory). In the illustrated embodiment, each of the computer readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 100 may also include a R/W drive or interface 314 to read from and write to one or more portable computer readable storage media 326. Application programs 328 on computing device 100 may be stored on one or more of the portable computer readable storage media 326, read via the respective R/W drive or interface 314 and loaded into the respective computer readable storage media 308.

Computing device 100 may also include a network adapter or interface 316, such as a TCP/IP adapter card or wireless communication adapter (such as a 4G wireless communication adapter using OFDMA technology). Application programs 328 on computing device 100 may be downloaded to the computing device from an external computer or external storage device via a network (for example, the Internet, a local area network or other wide area network or wireless network) and network adapter or interface 316. From the network adapter or interface 316, the programs may be loaded onto computer readable storage media 308. The network may comprise copper wires, optical fibers, wireless transmission, routers, firewalls, switches, gateway computers and/or edge servers.

Computing device 100 may also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 may comprise hardware and software (stored on computer readable storage media 308 and/or ROM 306).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
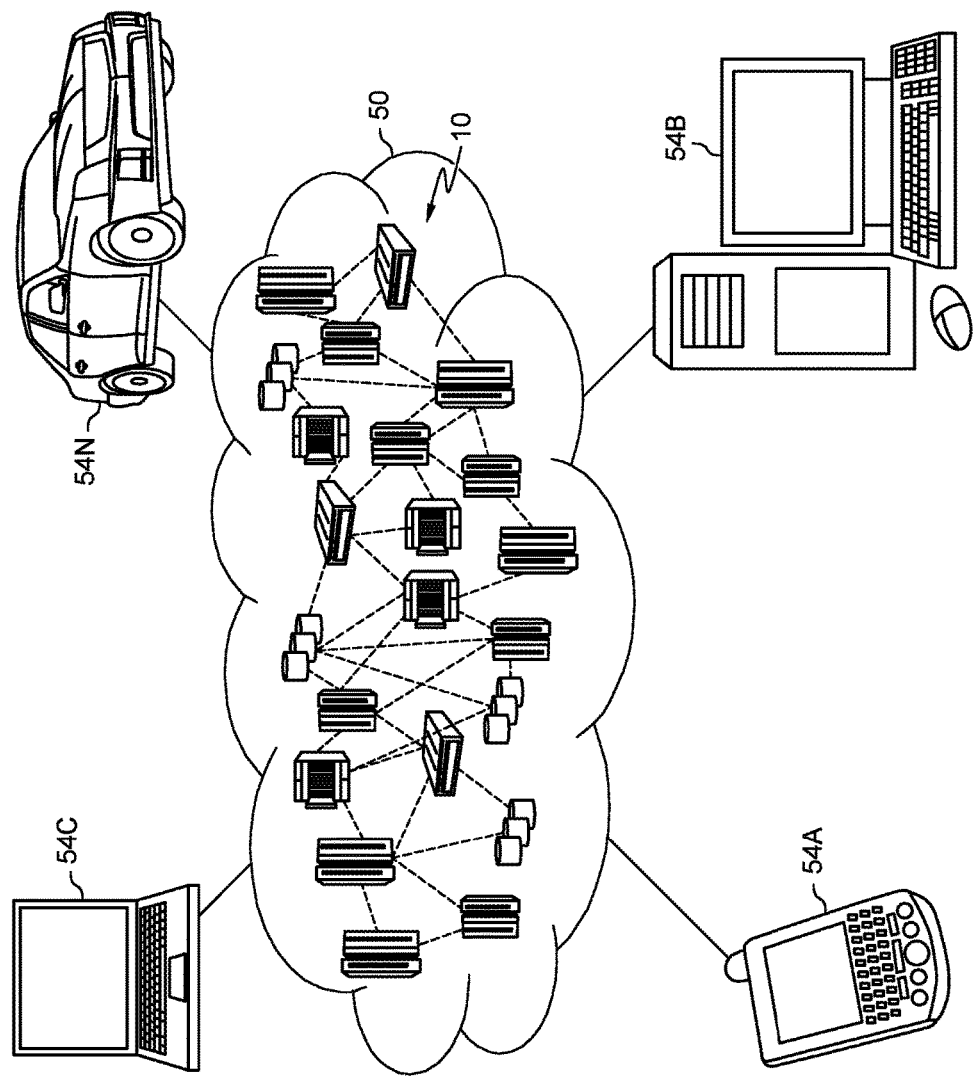
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
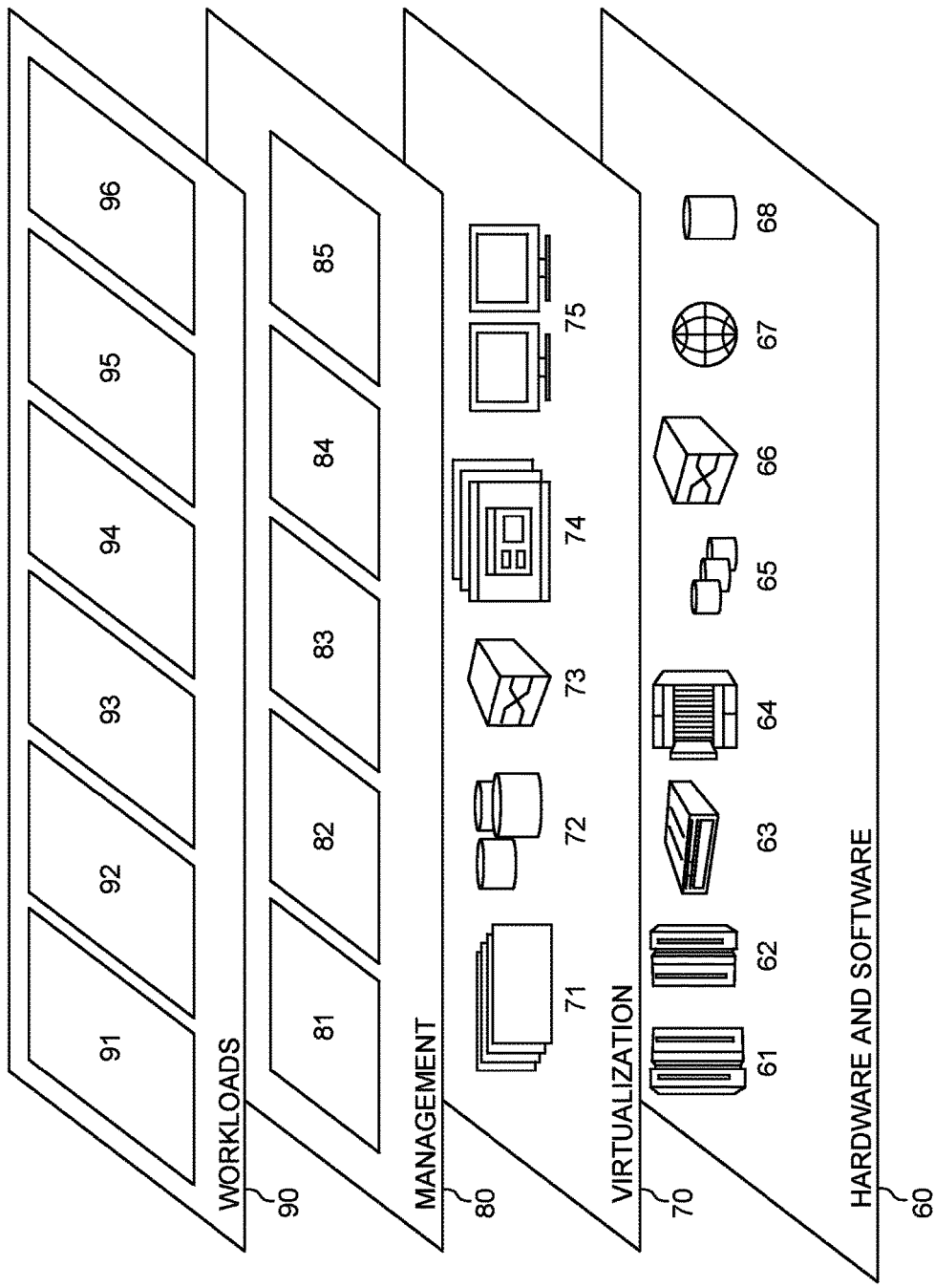
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and distractor generation 96.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

What is claimed is:

1. A method for generating distractors for text-based multiple choice test (MCT) items, the method comprising:
   receiving, by a first computer from a second computer over a network, in response to information entered into a user interface on the second computer, an MCT item stem and key;
   submitting, by the first computer, the stem to a question answering (QA) system wherein a QA system is a computer system that, in response to a query, automatically generates a list of candidate answers to the query;
   in response to submitting the stem to the QA system, receiving, by the first computer, from the QA system a plurality of candidate answers;
   identifying, by the first computer, one or more incorrect candidate answers in the plurality of candidate answers;
   extracting, by the first computer, textual features from the stem, wherein a textual feature is a term in the stem or a concept semantically related to a term in the stem;
   applying, by the first computer, a machine learning model to generate a set of semantic criteria associated with the extracted textual features;
   selecting, by the first computer, as distractors one or more of the incorrect candidate answers, that satisfy the generated semantic criteria;
   creating, by the first computer, an MCT item that includes the stem, the key, and the distractors; and
   transmitting, by the first computer, the created MCT item via the network to the second computer.

2. A method in accordance to claim 1, wherein the stem is one of: a question to be answered, a problem to be solved, or an incomplete statement to be completed.

3. A method in accordance to claim 1, wherein the MCT item stem includes a predefined number of alternative choices, and the plurality of candidate answers is at least the predefined number of alternative choices and less than a predefined maximum number.

4. A method in accordance to claim 1, wherein identifying, by the first computer, incorrect answers comprises:
   identifying, by the first computer, a correct answer by comparing the plurality of candidate answers with the key; and
   deleting, by the first computer, the correct answer from the plurality of candidate answers.

5. A method in accordance to claim 1, wherein generating the set of semantic criteria associated with the extracted textual features comprises:
   applying, by the first computer, a trained machine learning model to the extracted textual features, using a predefined set of semantic criteria; and
   refining, by the first computer, the set of semantic criteria by applying a predefined set of rules.

6. A method in accordance to claim 5, wherein applying, by the first computer, a trained machine learning model further comprises using, by the first computer, multi-label classification.

7. A method in accordance to claim 1, wherein selecting a subset of the incorrect candidate answers, based on the generated semantic criteria, comprises:
   generating, by the first computer, hypotheses concerning the semantic criteria and the incorrect candidate answers;
   collecting, by the first computer, evidence supporting or refuting each hypothesis;
   assigning, by the first computer, to each hypothesis a numerical value representing a degree to which the evidence justifies or refutes the hypothesis; and
   selecting, by the first computer, the subset of the incorrect candidate answers based on the numerical value.

* * * * *